United States Patent
Ishikawa

[19]

[11] Patent Number: 5,951,138
[45] Date of Patent: *Sep. 14, 1999

[54] SURFACE LIGHT SOURCE DEVICE OF SIDE LIGHT TYPE

[75] Inventor: Tsuyoshi Ishikawa, Tokyo, Japan

[73] Assignee: Enplas Corporation, Kawaguchi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/715,381

[22] Filed: Sep. 12, 1996

[30] Foreign Application Priority Data

Sep. 12, 1995  [JP]  Japan .................................. 7-258328

[51] Int. Cl.⁶ ...................................................... F21V 5/02
[52] U.S. Cl. ........................... 362/31; 362/330; 362/331; 362/339
[58] Field of Search .................... 362/26, 27, 31, 362/311, 330, 331, 339, 355; 349/64, 65

[56] References Cited

U.S. PATENT DOCUMENTS

| | | | |
|---|---|---|---|
| 5,130,898 | 7/1992 | Akahane | 362/31 |
| 5,134,549 | 7/1992 | Yokoyama | 362/31 |
| 5,390,085 | 2/1995 | Mari-Roca et al. | 362/31 |
| 5,408,387 | 4/1995 | Murase et al. | 362/31 |
| 5,442,523 | 8/1995 | Kashima et al. | 362/31 |
| 5,467,417 | 11/1995 | Nakamura et al. | 362/31 |

FOREIGN PATENT DOCUMENTS

| | | |
|---|---|---|
| 4-22780 | 2/1992 | Japan . |
| 4-62519 | 2/1992 | Japan . |
| 4-61302 | 5/1992 | Japan . |
| 4-268506 | 9/1992 | Japan . |
| 5-33131 | 4/1993 | Japan . |
| 5-38601 | 5/1993 | Japan . |
| 8-271893 | 10/1996 | Japan . |

*Primary Examiner*—Alan Cariaso
*Attorney, Agent, or Firm*—Staas & Halsey

[57] ABSTRACT

A surface light source device of side light type is provided to achieve achieves both avoidance of pattern see-through and retainment of brightness around the front direction. Light of a lamp 1 surrounded by a reflector 6 is introduced into a wedge-shaped light guide plate 2 via an incidence surface 21. In the process that the light is guided toward a terminal surface 24 while being repeatedly reflected at an emission surface 22, back surface 23 or reflector 4 of the light guide plate 2, illumination light is gradually taken out of the emission surface 22. A light diffusion sheet 35 having weak light diffuseability and a prism sheet 30 are disposed outside emission surface 22. The light subject to weak light diffusion action through the weak light diffusion sheet 35 is incident from an incident surface 301 to the prism sheet 30 without loosing directivity, exiting from a bright surface 302 consisting of a number of prism arrays. This illumination light is mainly output toward around the front-directional at high brightness while having suitable expanse in direction of propagation. Simultaneously, pattern see-through phenomenon is suppressed to the extent so that it will no longer take place even when directly looking at bright surface 302.

3 Claims, 6 Drawing Sheets

(PRIOR ART)

SURFACE LIGHT SOURCE DEVICE OF SIDE LIGHT TYPE

BACKGROUND

1. Field of the Invention

The present invention relates to a surface light source device of the type having with a light guide plate provided with a primary light source disposed on one side thereof and one surface acting as an emission surface (hereinafter, referred to as "surface light source device of side light type"), and more particularly to improvements in the surface light source device of side light type having a light guide plate with a back surface on which a distribution pattern of light diffusible elements is provided. The surface light source device of side light type in accordance with the present invention is specifically adaptable for use as a back-light source for liquid crystal display.

2. Related Art

A description will first be given on the typical structure and operation of a surface light source device of side light type. FIG. 1 is a main-part cross-sectional diagram showing the basic structure of a prior known surface light source device of side light type along with an arrangement for brightness measurement as described later. In this figure, the numeral 2 designates a light guide plate made of a transparent plastic material. On the side of light guide plate 2, a rod-shaped light source element 1 is disposed as the primary light source along the side edge surface (incidence surface) 21 of the light guide plate 2. Typically, a cold cathode tube such as a fluorescent lamp is employed for the light source element 1. The light source element 1 will be simply called the "lamp" hereinafter.

One surface of the light guide plate 2 acts as an emission surface 22. In order to facilitate retirement of the uniformity of brightness for emission surface 22, the cross-sectional shape of light guide plate 2 is designed in most cases so as to resemble a wedge with its lamp side being increased in thickness. One or a plurality of sheet-like elements 3 (referred to as "additional elements" hereinafter) are additionally disposed on the emission surface 22. The additional element(s) 3 may include a light diffusion sheet, prism sheet, prism protective sheet, interference-pattern elimination sheet, and others.

A reflector 4 made of a light reflection sheet is disposed along the opposite surface 23 (hereinafter, referred to as "back surface" while being called "reflection surface" in some cases) to the emission surface 22. Silver thin-film or foil, aluminum foil, white sheet or the like may be used for reflector 4. Although illustration is omitted, a reflector is arranged on the rear-surface side of lamp 1 for enhancement of the incidence efficiency of light to the light guide plate 2.

Most light rays radiated from the lamp 1 are introduced directly or indirectly from the light guide plate 21 into the inside of the light guide plate 2. The light introduced into light guide plate 2 is optically guided to travel toward a terminal surface 24 while it is repeatedly reflected at the front and back surfaces 22, 23 of the light guide plate 2. During such processes, illumination light will be gradually taken out of emission surface 22, finally providing illumination light through the action (light diffusing action, etc.) of the additional element 3. This illumination light will be utilized as back-light illumination of a liquid crystal display, for example.

In order to attain uniform brightness of the emission surface 31 as formed on the outside surface of additional element 3 and thereby to direct the light introduced inside light guide plate 2 to the side of emission surface 22 positively, a number of elements having light diffusing ability or "diffuseability" are disposed on the side of back surface 23 of the light guide plate 2 with a certain distribution pattern established. This distribution pattern is also called the "dot pattern" due to the fact that the pattern consists of multiple dot-shaped elements arranged according to certain rules.

Figure 2:
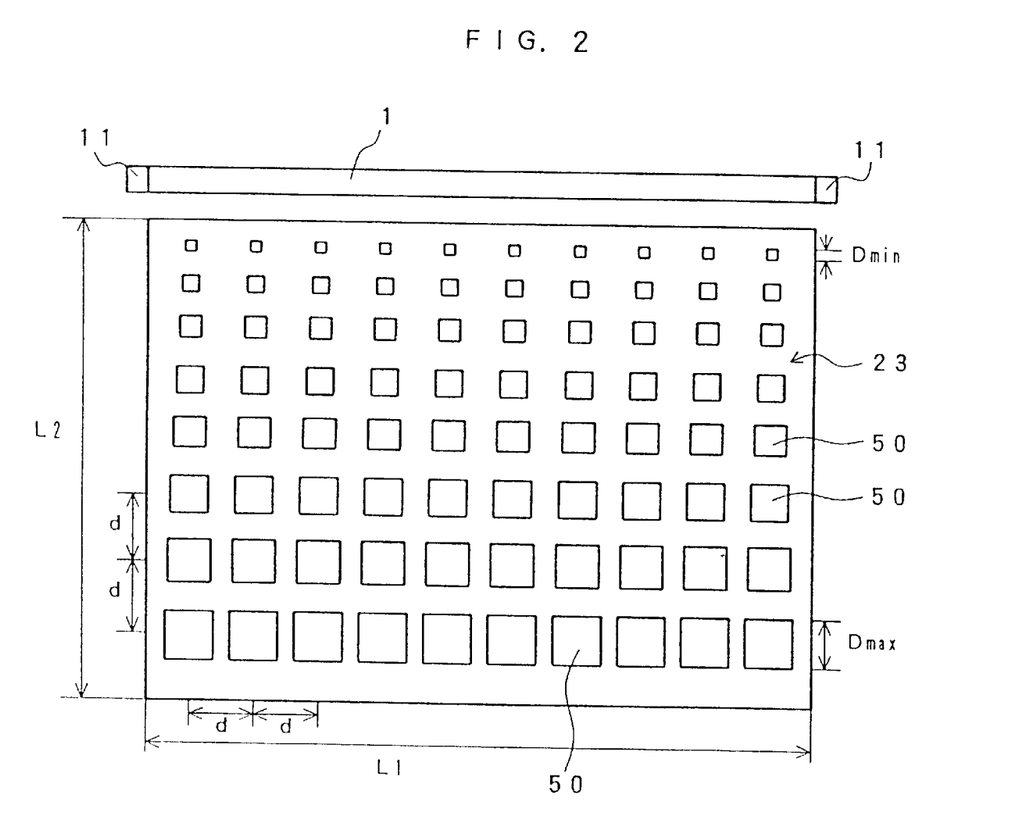
FIG. 2 is a diagram for explanation of the basic form of a distribution pattern of light diffusion elements as formed on the back surface of a light guide plate.

FIG. 2 is a diagram for explanation of the basic form of such distribution pattern of the light diffusible elements, wherein the light guide plate 2 is depicted in plan view as looked at from the side of its back surface 23. In this drawing, respective light diffusible elements 50 are illustrated with a number of marks "□" in various sizes. Each light diffusible element 50 is formed as a print layer of light diffusible inks, a satin finish surface (fine unevenness surface), or the like. The sizes of light diffusible elements 50 are so designed as to exhibit the minimum value Dmin at the nearest array to the lamp 1 having an electrode section 11, whereas it takes the maximum value Dmax at the farthest array from lamp 1.

The multiple light diffusible elements 50 in this example are provided in a matrix shape with pitch d defined in common for the longitudinal and transverse directions thereof. Regarding the distribution pattern of light diffusible elements 50 and the shape of the individual light diffusible element 50, a lot of modifications have been proposed. In any case, the concept of increasing the covering rate with distance from lamp 1 is employed. Here, the term "covering rate" refers to the "the area occupation ratio of the region having the light diffuseability." This will be called "pattern covering rate" hereinafter. The above concept is by taking reasonable viewing from general demands for uniform brightness over the entire area of the emission surface 22.

A problem with the case where such light diffusible elements 50 are provided on the back surface 23 of light guide plate 2 is what is called the "pattern see-through". This pattern see-through is a phenomenon that the pattern of light diffusible elements 50 formed on the back surface 23 of light guide plate 2 is observed through the side of emission surface 22; it tends to be striking as the light guide plate 2 gets smaller in thickness and as the light diffusible elements 50 increase in pattern pitch d.

When the surface light source device with visually recognizable pattern see-through is used as a back light for liquid crystal display, this will obviously degrade display quality. In accordance with a prior art, in order to eliminate the pattern see-through, a light diffusion sheet having strong light diffuseability is used as the additional element 3 arranged on the emission surface 22. According to another prior art, the pattern see-through was prevented by employing a plurality of light diffusion sheets overlapped each other.

Furthermore, it has been attempted to avoid see-through by employing two or more prism sheets capable of increasing the illumination light toward the front direction.

However, the method of erasing pattern see-through by reinforcement of light diffusion action suffers from a difficulty that the brightness as the surface light source device decreases simultaneously. Moreover, once the output light from emission surface 22 looses directivity due to such strong light diffusion action, it becomes difficult for the prism sheet to offer its inherent actions sufficiently.

Figure 3:
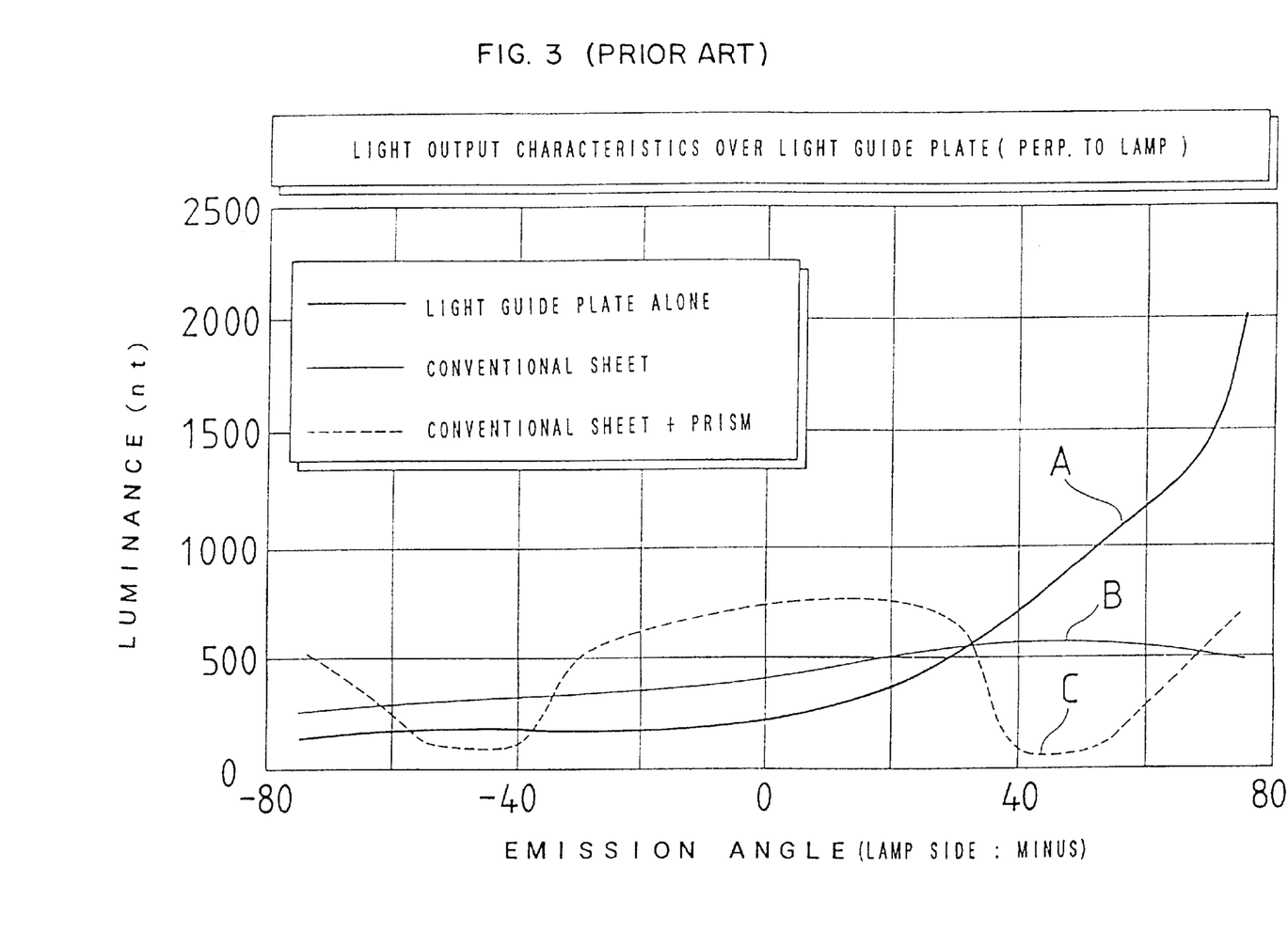
FIG. 3 is a graph representing some measurement results of light output characteristic for the cases of "light guide plate alone", "light guide plate+ordinarily used conventional light diffusion sheet" and "light guide plate+ordinarily used conventional light diffusion+prism sheet arranged outside thereof".

FIG. 3 is a graph showing this situation as a practical example. Layout of brightness measurement deriving the results of this graph is schematically coindicated in FIG. 1. Specifically, a brightness meter M is located in a rotation-scannable way under the condition that it looks at the center point P of the outermost additional element 3 or emission surface 22 (no additional element 3) from a position as spaced apart from it by a predefined distance (320 mm). While scanning is done in a range of the angle θ (transverse axis of graph),with respect to a perpendicular N upstanding at the center point P to cover from about −80 degrees to +80 degrees, brightness values (ordinate axis of graph) were plotted in "nt" (candela/m$^2$).

Curves A, B, C represent measurement results as to the cases of "light guide plate alone (without use of additional elements)", "light guide plate+conventionally widely commercially available ordinary light diffusion sheet" and "light guide plate+conventionally widely commercially available ordinary light diffusion sheet+prism sheet (by Mitsubishi Rayon: DIAART H159 [trade name] with the prism vertical angle of 90 degrees) disposed outside it", respectively.

The size of light guide plate 2 is L1=166 mm, L2=219 mm; the thickness on the side of incidence surface 21 is 3 mm; the thickness on the side of terminal surface 24 was 1 mm. Then, the pitch between adjacent light diffusible elements 50 is d=1.0 mm; the minimum size Dmin=0.34 mm; the maximum Dmax=0.8 mm. The prism sheet was arranged so that the prism arrays (groove arrays) are oriented parallel with the lamp, and that the prism surface faces outward. From the graph, the following can be seen.

1. Curve A: the output light from the emission surface 22 of light guide plate 2 is mainly emitted in the forward direction while slightly rising or upstanding from emission surface 22, whereas almost no light rays are output around the front direction (250 nt or less).
2. Curve B; the conventional light diffusion sheet acting on the output light from emission surface 22 of light guide plate 2, the light propagation direction is forced to diffuse in a wide range causing resultant directivity of illumination light to become weak extremely. It should be noted that the light diffusion action provides a remarkably improved brightness (by 400 nt or more) in the front direction (around directions of θ=0 degrees) as compared with the case of using light guide plate 2 alone. The brightness of 500 nt or greater was obtained in a wide angular range of from θ=20 degrees to 70 degrees.
3. Curve C; the prism sheet further disposed outside the conventional light diffusion sheet, most part of light is collected in the front direction resulting in that the brightness as looked at from around θ=0 degrees increases significantly (up to about 700 nt to 750 nt). However, the brightness distribution remains slightly deviated in the forward direction while the brightness on the θ<0 side is somewhat lowered.

On the other hand, the evaluation as to the pattern see-through was as follows.

1. In the use of the light guide plate alone (curve A), pattern see-through was clearly observed on the emission surface 22. In the case of observation through a liquid crystal panel, pattern see-through was also recognized.
2. In the case of the light guide plate+light diffusion sheet (curve B), pattern see-through was recognized a little on the emission surface 31. However, when observing through the liquid crystal panel, no pattern see-through was recognized.
3. In the case of light guide plate+light diffusion sheet+ prism sheet (curve C), pattern see-through was recognized a little on emission surface 31; however, when observing through the liquid crystal panel, no pattern see-through was recognized.

Note that although not described in FIG. 3, when another prism sheet (two in total) is disposed outside the arrangement from which curve C was obtained, the brightness as looked at from the front direction (around θ=0 degrees) was further increased obtaining the value of 1,050 nt or around it. Additionally, regarding the pattern see-through, a little further improvement was recognized as compared with the case of curve C.

OBJECT AND SUMMARY OF INVENTION

As described above, the conventional arts avoid pattern see-through by employing an additional element(s) with strong diffusiability while the resultant light widely diversed is re-collected around the front direction by means of a prism sheet(s). Therefore, a single prism sheet is liable to provide an insufficient brightness around the front direction. If two prism sheets are employed, the brightness around the front direction will be improved while an increase in the number of components will provide disadvantages in view of simplification of structure and manufacturing cost.

It is an object of the present invention to provide a technical means for avoiding the problems of conventional surface light source devices of side light type. More specifically, the present invention is to provide a surface light source device of side light type which can accomplish both avoidance of pattern see-through and retirement of brightness around the front direction without increasing the number of components used.

In accordance with the present invention, the surface light source device is equipped with a diffusion sheet in combination with a prism sheet with the diffusion sheet exhibiting light diffuseability weaker than that of the conventional light diffusion sheet. In the surface light source device of side light type of the present invention, a single weak light diffusion sheet is disposed along the emission surface of light guide plate while a single prism sheet is disposed outside it.

A distribution pattern of minute light diffusion elements is formed on the back surface of light guide plate so as to have a tendency to increase the pattern covering rate with distance from the primary light source. Preferably, the sizes of the minute light diffusion elements satisfies the condition that the minimum value is less than or equal to 0.2 mm and the maximum value is 0.5 mm or less. The formation pitch of the light diffusion elements is usually 1 mm or less, preferably, 0.7 mm or less.

The prism sheet is disposed so that its prism face on which prism arrays are formed faces externally while the prism arrays are parallel with the extending direction of the primary light source. Typically, the prism vertical angle is designed at approximately 90 degrees.

In accordance with the advantages of the present invention, it is possible to accomplish both avoidance of pattern see-through and retirement of the brightness around the front directions. In the surface light source device of side light-type of the invention, the light of illumination as output from the emission surface is caused to enter the prism sheet through the action of the light diffusion sheet with weak light diffuseability. The resultant light subject to such weak light diffusion action through the weak light diffusion sheet exhibits a remarkable directivity, unlike the light such that passed through a conventional sheet with strong light diffuseability for eliminating pattern see-through.

More specifically, the illumination light sent forth from the emission surface of the light guide plate has strong directivity in a direction that rises at a small angle from the extending direction of emission surface and this directivity is moderated by the light diffusion sheet with weak light diffuseability, with the result that the light is converted into light exhibiting remarkable directivity in the direction angle-raised significantly from the extending direction of the emission surface. Upon supplying of this light to the prism sheet, illumination light is obtained from the outside-facing prism face with high brightness toward around the front direction while permitting a moderate expansion of the propagation direction thereof.

Suppression of pattern see-through is successfully achieved by employing an arrangement such that a sheet with weak diffusiability is put on a prism sheet, with the result that pattern see-through is hardly found even when the bright surface is directly observed. This effect is secured more positively by adopting the condition that the sizes of the minute light diffusion elements have the minimum value less than or equal to 0.2 mm and the maximum vale less than or equal to 0.5 mm. Under this condition, the formation pitch of the light diffusion elements is usually designed as to be less than or equal to 1 mm for providing a required pattern covering ratio.

The present invention will be described in detail with reference to the accompanying drawings.

BRIEF DESCRIPTION OF DRAWINGS

FIG. 1 is a diagram showing a cross-sectional view of the basic structure of a conventional surface light source device of side light type, together with a layout of brightness measurements.

PREFERRED EMBODIMENTS

Figure 4:
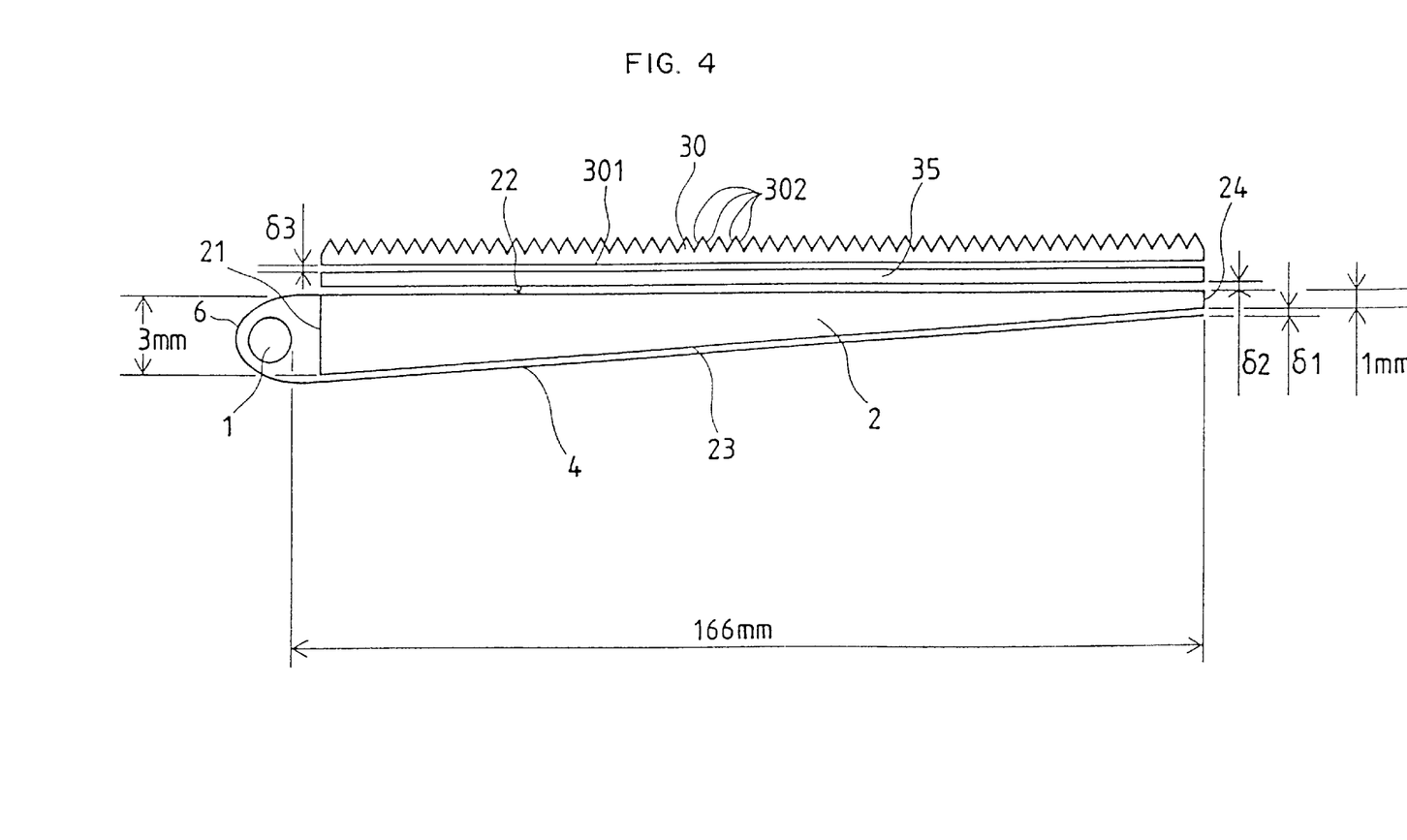
FIG. 4 schematically illustrates a cross-section of the structure of a surface light source device of side light type in accordance with the present invention.

In FIG. 4, an example of the structure of a surface light source device of side light type in accordance with the present invention is shown. The basic structure of the overall arrangement corresponds to the surface light source devices of side light type shown in FIG. 1 and FIG. 2 with the additional element 3 being replaced by a light diffusion sheet 35 having weak light diffuseability and a prism sheet 30.

Numeral 2 designates a light guide plate having a wedge-shaped cross-section, which is made of a transparent plastic material. A rod-shaped lamp (cold-cathode tube) 1 is disposed as the primary light source side-by-side with the light guide plate 2 and along an incidence surface 21. The lamp 1 is surrounded, from its back surface side, by a reflector 6 consisting of a light reflection sheet.

While one surface of the light guide plate 2 acts as an emission surface 22, a reflector 4 made of a member having strong light-diffusional/reflectivity (for example, a white sheet) is arranged along the back surface 23 of plate 2. An extremely thin air layer (gap $\delta1$) is formed between the back surface 23 and the reflector 4. Most light rays radiated from lamp 1 are introduced, directly or after reflection at the reflector 6, into light guide plate 2. The light introduced inside the light guide plate 2 is optically guided toward a terminal surface 24 while being repeatedly reflected on the front and back surfaces 22, 23 of the light guide plate 2. During this process, illumination light is gradually taken out of emission surface 22.

A light diffusion sheet 35 having weak light diffuseability (by Tsujimoto Denki: D118, referred to as "weak light diffusion sheet" hereinafter) is arranged outside the emission surface 22 while a prism sheet 30 is disposed outside the weak light diffusion sheet. Numeral 301 denotes an incidence surface of prism sheet 30 and numeral 302 designates a bright surface consisting of a number of prism arrays. Extremely thin air layers are formed between the emission surface 22 and weak light diffusion sheet 35 (gap $\delta2$) and also between weak light diffusion sheet 35 and prism sheet 30 (gap $\delta3$), respectively.

Output illumination light emitted from the emission surface 22 is incident to the prism sheet 30 from incidence surface 301 after being subject to weak light diffusion action through weak light diffusion sheet 35. The illumination light propagated through prism sheet 30 is sent forth externally mainly toward around the front direction while being effected by actions (known refraction action and light-collection action) of multiple prism arrays (the prism vertical angle is 90 degrees or, thereabout). Examples of the light output characteristic will be described later.

In order to retain uniform brightness of the bright surface 302 over the entire light guide plate 2 while enhancing the function of forcing the light introduced into the light guide plate 2 to direct toward the emission surface 22, a number of elements having light diffuseability are disposed on the back surface 23 of the light guide plate 2 in a manner such that they define a designed distribution pattern. Each light diffusion element is formed as a print layer of light-diffusible ink, a satin finish surface (fine unevenness surface), or the like.

As described previously, it is generally permissible that the distribution pattern may be freely designed under a condition such that the pattern covering rate tends to increase with distance from the lamp 1; for instance, the pattern shown in FIG. 2 is employed. Note that in order to eliminate pattern see-through more completely, it is required that the light diffusion elements 50 are as minimized in size as possible. In addition, in order to prevent the pattern covering rate from decreasing, the pattern pitch is designed so as to decrease accordingly. In ordinary cases, the formation pitch of light diffusion elements 50 is less than or equal to 1 mm, preferably, 0.7 mm or less. A preferable size range of the light diffusion elements 50 in the form as shown in FIG. 2 is given as follows:

Minimum size Dmin<0.2 mm,

Maximum size Dmax<0.5 mm.

Figure 5:
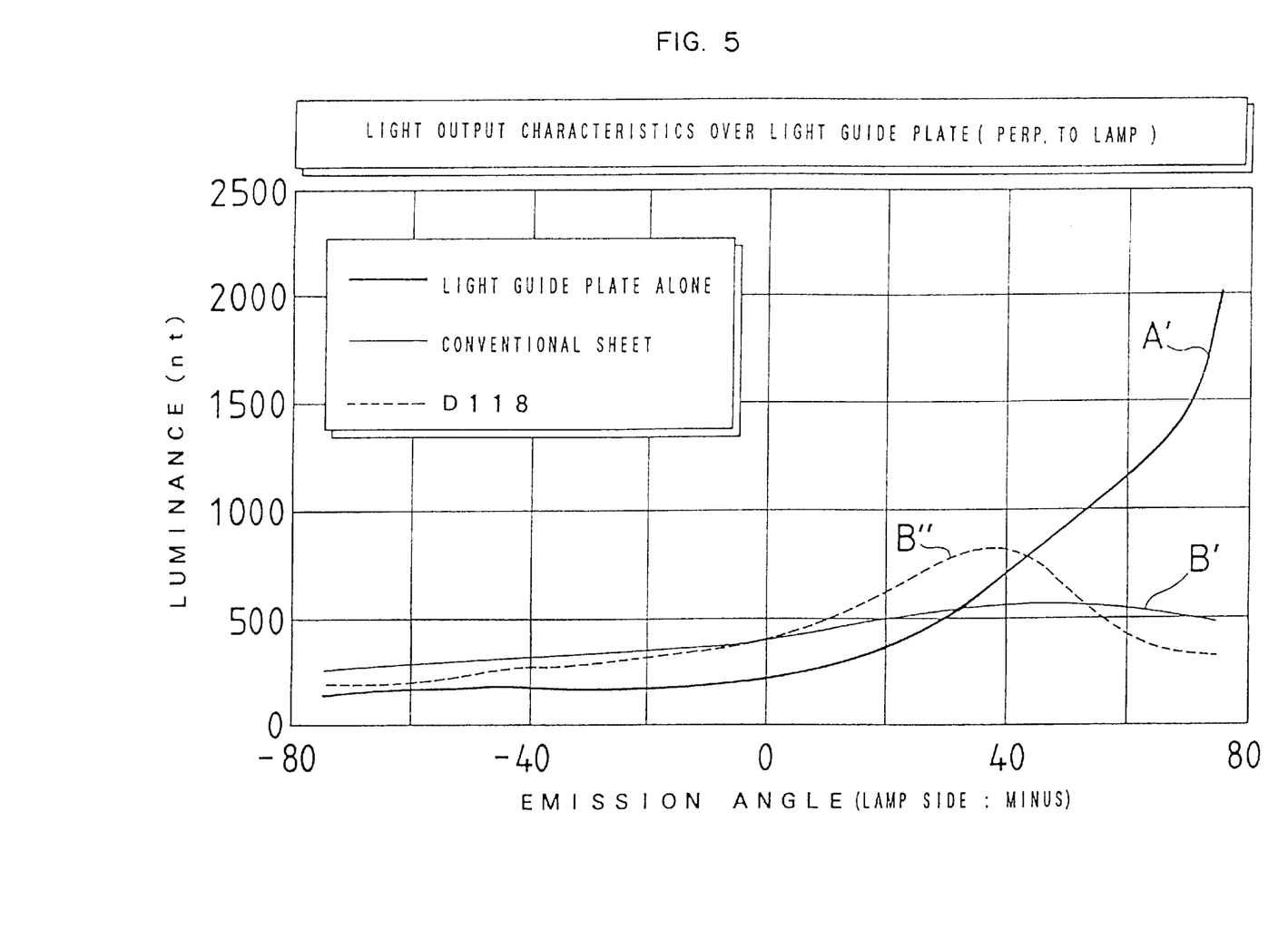
FIG. 5 is a graph representing measurement results of light output characteristic for the cases of "light guide plate alone", "light guide plate+ordinarily used conventional light diffusion sheet" and "light guide plate+weak light diffusion sheet".
Figure 6:
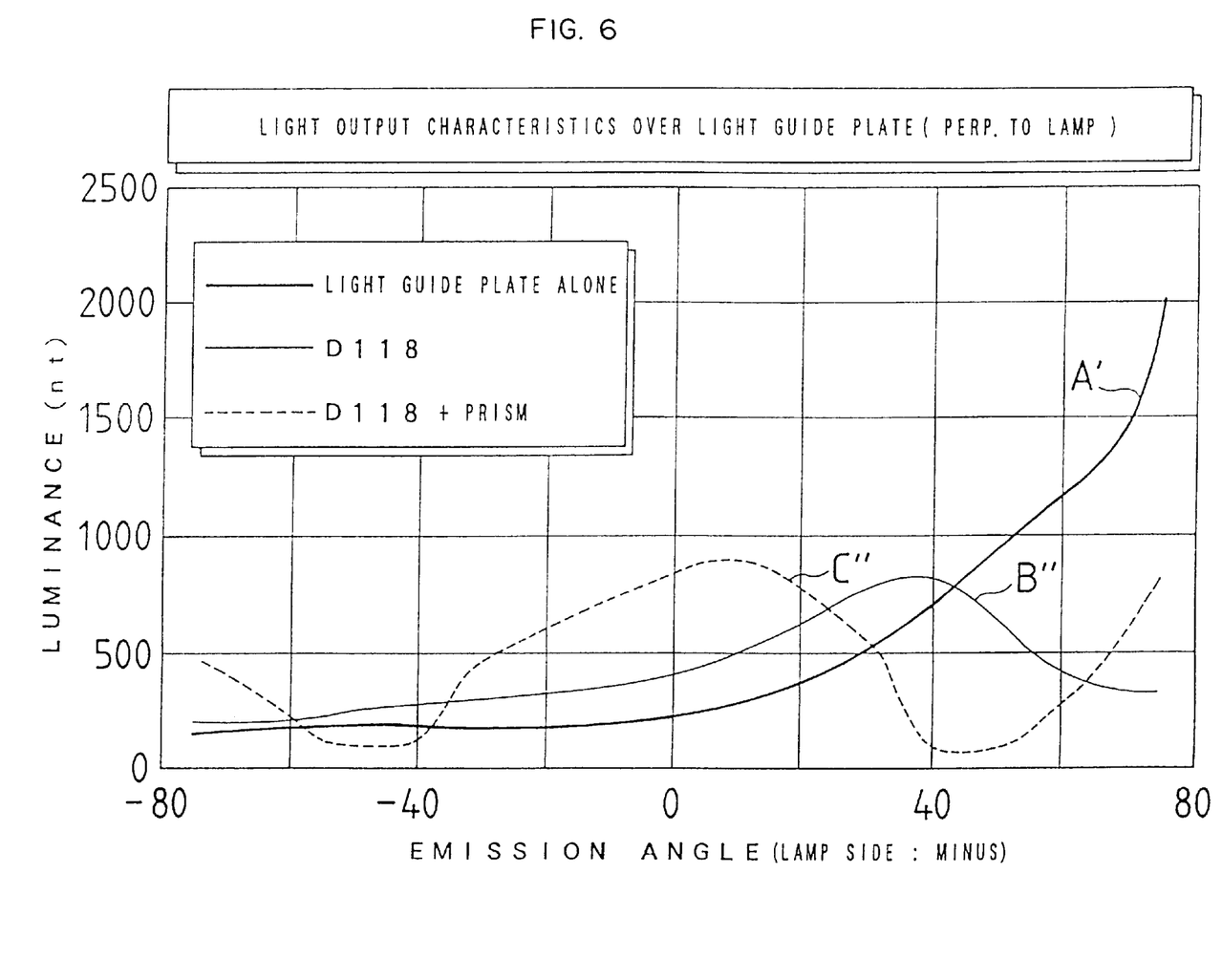
FIG. 6 is a graph showing measurement results of light output characteristic for the cases of "light guide plate alone", "light guide plate+weak light diffusion sheet" and "light guide plate+weak light diffusion sheet+prism sheet".
Figure 7:
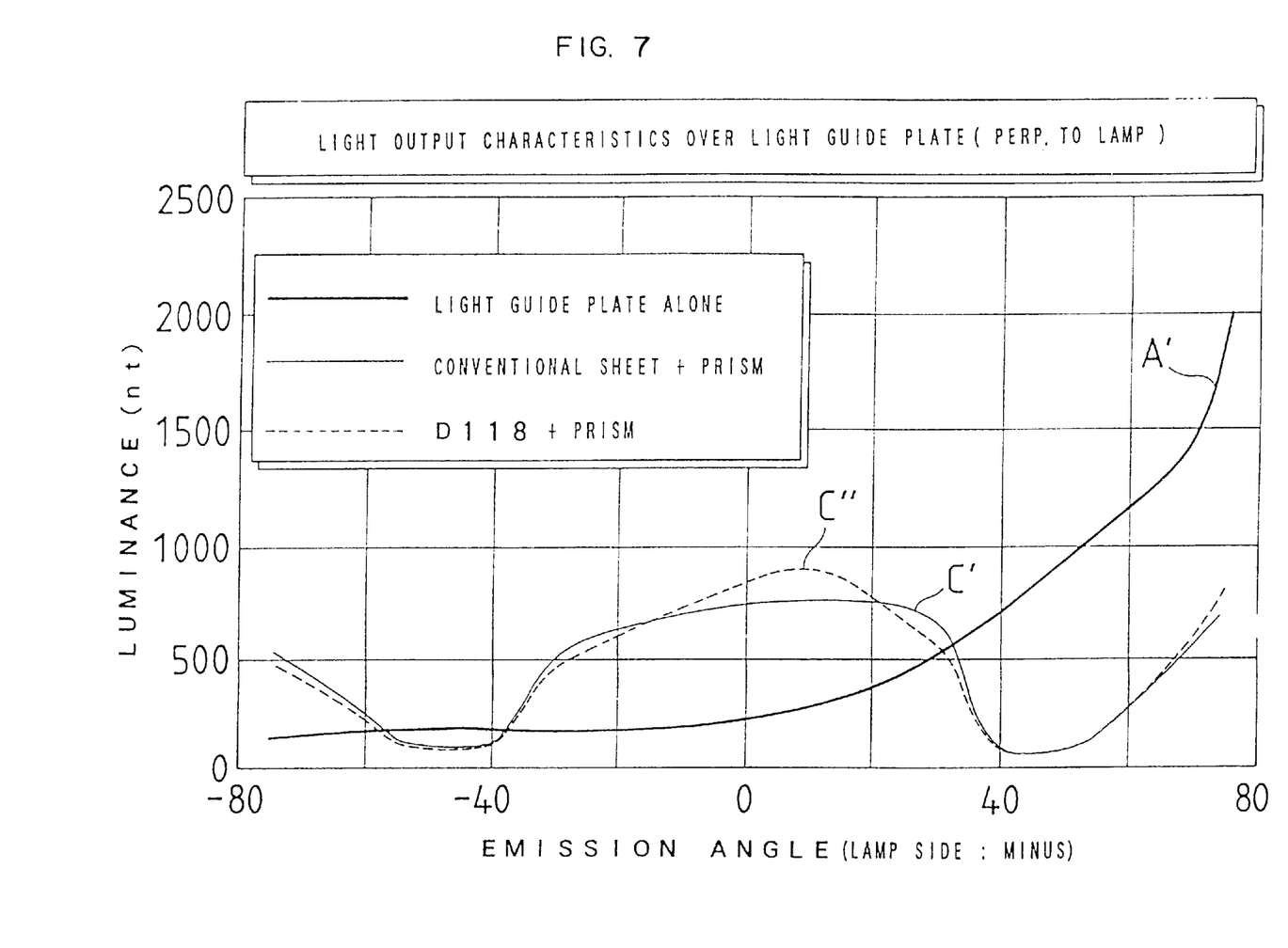
FIG. 7 is a graph showing measurement results of light output characteristic for the cases of "light guide plate alone", "light guide plate+ordinarily used conventional light diffusion sheet+prism sheet" and "light guide plate+weak light diffusion sheet+prism sheet".

The most significant feature of the present invention lies in that the weak light diffusion sheet 35 is employed in combination with the prism sheet 30. Here, the characteristics of weak light diffusion sheet 35 having weak light diffuseability will first be explained with reference to a graph of FIG. 5. The indication method and conditions for brightness measurement in the graphs of FIG. 5 and later-discussed graphs of FIG. 6 and FIG. 7 are basically the same as those of the graph of FIG. 3. Note that the size and pitch conditions of light diffusion elements 50 formed on the back surface 23 of light guide plate 2 are different as follows:

Pitch among the light diffusion elements 50 d=0.5 mm, minimum size Dmin=0.17 mm, and maximum Dmax= 0.4 mm.

The size of light guide plate 2 is designed in the same way as in the case of FIG. 3 as follows: L1=166 mm, L2=219 mm; the thickness at the incidence surface 21 is 3 mm; the thickness at the terminal surface 24 was 1 mm.

The prism sheet 30 and its orientation are the same as those in the case of FIG. 3. Specifically, a DIAART H159 (trade name) with prism vertical angle of 90 degrees by Mitsubishi Rayon is disposed so that its prism arrays (groove arrays) are aligned in parallel with lamp 1 while the prism surfaces (bright surfaces 302) face externally.

For the weak light diffusion sheet 35, D118 by Tsujimoto Denki was employed.

Curves A', B', B" drawn in the graph of FIG. 5 represent the measurement results for the cases of "light guide plate alone", "light guide plate+ordinarily used conventional light diffusion sheet" and "light guide plate+weak light diffusion sheet" respectively. From this graph, the following will be seen:

1. Curve A'; in the same way as in the case of FIG. 3, the output light from emission surface 22 of the light guide plate 2 is output to propagate mainly in the forward direction as slightly raised from the emission surface 22, while few rays are output (250 nt or less) in the front direction (around of $\theta=0$ degrees).

2. Curve B': in the same way as in the case of FIG. 3, when the conventional light diffusion sheet acts on the output light from emission surface 22 of the light guide plate 2, the propagation direction of light is diffused in a wide range, causing the resulting illumination light to be extremely weak in directivity. The brightness in the front direction (around $\theta=0$ degrees) is about 400 nt brightness more than 500 nt was obtained in a wide angular range from $\theta=20$ degrees to 70 degrees.

3. Curve B": In the case where a weak light diffusion sheet is employed instead of the conventional known light diffusion sheet, diffusion of light propagation direction is not so significant. Therefore, directivity of illumination light is moderately retained. The direction of the brightness peak is $\theta=40$ degrees or around it with a brightness value around 800 nt. Further saying brightness of 500 nt or more was obtained in a wide angular range of approximately from $\theta=10$ degrees to 55 degrees.

The above results suggest that the light output correction function of the prism sheet 30 works effectively when prism sheet 30 is arranged outside the weak light diffusion sheet 35. More specifically, unlike the case (FIG. 3 graph C) of entry of light that once lost directivity as in the prior art, the directivity of illumination light is moderately retained while the brightness peak direction is raised toward the front direction as compared with the event of output from emission surface 22, which advantageously assists in the prism sheet 30 in effecting attain output direction correction.

The graph of FIG. 6 is a measurement example for demonstrating the above discussions. The conditions for measurement are the same as described previously to keep consistency with the graphs of FIG. 3 and FIG. 5. Curves A', B" depicted in the graph of FIG. 6 are quite the same as A', B" in the graph of FIG. 5. Curve C" represents the measurement result for the case of "light guide plate+weak light diffusion sheet+prism sheet", from which the features of the present invention can be readily seen.

More specifically, as a result of the fact that the output light from the emission surface 22 of the light guide plate 2 is forced to pass through prism sheet 30 after being influenced by the weak light diffusion sheet 35, the illumination light shows the following features:

1. It has a clear, high brightness peak (about 850 nt) around the front direction (approximately $\theta=5$ degrees).

2. It has a moderate expanse around the brightness peak while exhibiting approximately symmetrical brightness distribution. For example, the angular range in which the brightness of 500 nt or more is obtainable is approximately from $-30$ degrees to $+30$, with the distribution being almost symmetrical around the front direction.

A graph of FIG. 7 is presented for comparison with the case of using a light diffusion sheet with strong light diffuseability as employed in the prior art, wherein the conditions for measurement are the same as previously described to keep consistency with the graphs of FIG. 3, FIG. 5 and FIG. 6. Curves A', C" as plotted in the graph of FIG. 7 are quite the same as A', C" in the graph of FIG. 6.

Curve C' represents the measurement result for the case of "light guide plate+light diffusion sheet with strong light diffuseability+prism sheet". As can be seen from this graph, due to the fact that the output light from emission surface 22 of light guide plate 2 is forced to pass through the prism sheet 30 after being influenced by the weak light diffusion sheet 35, it is successfully accomplished that the brightness peak is enhanced and brought close to the front direction more positively.

On the other hand, evaluations on pattern see-through are as follows.

1. With use of a single light guide plate (curve A'), pattern see-through was clearly observed on the emission surface 22. In the case of observing through a liquid crystal panel, pattern see-through was also recognized (the same as the case of FIG. 3).

2. In the case of using the light guide plate+conventional light diffusion sheet (curve B'), pattern see-through was recognized a little on the bright surface 31. When observed through a liquid crystal panel, pattern see-through was not recognized (the same as the FIG. 3 case).

3. Even in the case of light guide plate+conventional light diffusion sheet+prism sheet (curve C'), pattern see-through was recognized a little on the bright surface 31; however, when observed through a liquid crystal panel, pattern see-through was no longer recognized. 4. In the case of light guide plate+weak light diffusion sheet+ prism sheet (curve C"), no pattern see-through was recognized even when directly observed bright surface 31. Naturally, when observed through a liquid crystal panel, no pattern see-through was recognized.

From the above discussion, it will be understood that the surface light source device of side light type in accordance with the present invention employing in combination the weak light diffusion sheet and prism sheet can almost perfectly eliminate pattern see-through while keeping good directivity characteristics of output light as well as its brightness level.

As described in detail, the present invention provides a surface light source device of side light type which achieves both elimination of pattern see-through and retirement of brightness around the front direction without increasing the number of components used. Accordingly, by using a surface light source device of side light type in accordance with the invention as a back light for liquid crystal display, a display screen free from display quality reduction due to pattern see-through and easy to observe from around the front direction is obtained.

What is claimed is:

1. A surface light source device of side light type, comprising:

a light guide plate;

a rod-shaped primary light source disposed on one side of the light guide plate;

a weak light diffusion sheet disposed along an emission surface of said light guide plate;

a prism sheet disposed outside said weak diffusion sheet so that a prism face having a prism array formed thereon faces outward and said prism array being parallel with an extending direction of said primary light source; and a distribution pattern of minute light diffusion dot elements formed on a back surface of said light guide plate so as to have a tendency to increase a pattern covering rate with distance from said primary light source, the minimum size of said light diffusion dot elements being less than or equal to 0.2 mm and the maximum size of said light diffusion dot elements being less than or equal to 0.5 mm so that pattern see-through of the light diffusion dot elements is avoided.

2. A surface light source devise of side light type as claimed in claim 1, wherein a formation pitch of said light diffusion dot elements is less than or equal to 1 mm.

3. A surface light source device of said light type as claimed in claim 1 or 2, wherein said prism array is formed with a prism vertical angle of approximately 90 degrees.

* * * * *